UNITED STATES PATENT OFFICE.

HARRY PAULING, OF GELSENKIRCHEN, GERMANY, ASSIGNOR TO SALPETERSÄURE-INDUSTRIE-GESELLSCHAFT, G. M. B. H., OF GELSENKIRCHEN, GERMANY.

PROCESS OF CONCENTRATING NITRIC ACID.

1,031,865.      Specification of Letters Patent.      Patented July 9, 1912.

No Drawing.      Application filed September 27, 1910. Serial No. 584,124.

*To all whom it may concern:*

Be it known that I, HARRY PAULING, manager, subject of the King of Saxony, residing at 84 Wilhelmstrasse, Gelsenkirchen, IV., in the Kingdom of Prussia, German Empire, have invented a new and useful Improvement in Processes of Treating Aqueous Nitric Acid and the Like with Sulfuric Acid and other Hygroscopic Substances; and I do hereby declare the following to be a full, clear, and exact description of the same.

This invention relates to processes of concentrating or otherwise treating aqueous acids; and it comprises a process wherein a current of steam or other suitable hot gas is introduced into an apparatus, such as a distilling column, near one end thereof, a hygroscopic dehydrating agent, such as sulfuric acid or some other suitable hygroscopic substance, is introduced into the column at another point and travels in a direction opposed to that of the introduced hot gas, and an aqueous acid, specifically dilute nitric acid, is led into the common path of the counterflowing currents at some intermediate point and joins the current of the drying agent, vapors of strong nitric acid being evolved and passing in the direction of the introduced hot gases beyond the point at which the aqueous acid is led in, thus meeting the substantially pure drying agent in the latter part of their course through the apparatus; all as more fully hereinafter set forth and as claimed.

In another and copending application, Serial No. 584,123, filed September 27, 1910, I have described and claimed a process wherein a mixture of aqueous nitric acid with concentrated sulfuric acid, best substantially free of impurities such as nitro-sulfuric acid, etc., is treated with a counter-flowing current of a hot gas, highly concentrated nitric acid being vaporized and condensed, while relatively dilute sulfuric acid is obtained as a result of the dehydration of the nitric acid. I have found however that the result is improved by separately introducing the drying agent, for example sulfuric acid, before the aqueous acid which is to be treated; that is to say, when using a vertical column the drying agent is introduced at the top, and the aqueous acid at a point farther down. By this means the vapors generated by the heat are caused to come into contact with pure hygroscopic matter. This enables a higher degree of concentration to be obtained, and effects a saving in the consumption of hygroscopic matter.

It is convenient to carry out my improved process in a vertical distilling column or the like, provided with means for introducing a hot gas at or near the base, means near the top for withdrawing vapors of concentrated nitric acid, and means at some intermediate point for introducing aqueous acid which is to flow downwardly in the column against the current of hot gas introduced below. At a point somewhat above that at which the aqueous acid enters, there should be an inlet through which the hygroscopic agent may be admitted to the column.

In concentrating dilute nitric acid, for example, according to the present process, concentrated sulfuric acid is introduced into the upper part of the apparatus and flows downwardly therethrough, being joined at a lower point by aqueous nitric acid introduced as before described. Steam is led into the base of the column and passes upwardly against the counter-flowing current of the acid mixture. Any other hot gaseous medium not detrimental to nitric acid may be used instead of steam, but steam is most advantageous. The sulfuric acid abstracts much water from the dilute nitric acid immediately upon mixing therewith, but its avidity for water is enhanced by the heating effect of the gas current flowing against the acid mixture, and the dehydration of the nitric acid is thus rendered much more complete. Where steam is used, its latent heat is thus utilized to great advantage. As a result of this treatment the nitric acid is vaporized, and the concentrated vapors pass upwardly through the column beyond the point where aqueous nitric acid is admitted, meeting thereabove the current of substantially pure sulfuric acid where the dehydration is rendered substantially complete. The vapors of nitric acid leaving the top of the apparatus are of very high concentration and are condensed in any convenient manner. The spent sulfuric acid leaving the base of the column contains practically all the water originally in the dilute nitric acid, while it is itself substantially free of nitric acid.

What I claim is:—

1. The process of concentrating aqueous acid, which comprises establishing a current of a hygroscopic dehydrating agent and a counterflowing current of a hot gaseous medium comprising steam traveling in a common path, and introducing at an intermediate point in the common path of the opposed currents a current of an aqueous acid traveling in the same direction as said current of dehydrating agent.

2. The process of concentrating aqueous nitric acid, which comprises establishing a current of substantially pure sulfuric acid and a counterflowing current of steam traveling in a common path, introducing into said common path of the opposed currents a current of aqueous nitric acid traveling in the same direction as said current of sulfuric acid, and withdrawing vapors of highly concentrated nitric acid at a point prior to that at which said sulfuric acid current comes in contact with aqueous nitric acid.

3. The process of concentrating aqueous nitric acid, which comprises passing steam into the base of a column, introducing substantially pure sulfuric acid into said column near its top, introducing aqueous nitric acid into said column at some intermediate point below that at which sulfuric acid is admitted, and withdrawing vapors of concentrated nitric acid from the column at a point above that at which aqueous nitric acid is admitted, whereby the nitric acid vapors evolved in the lower part of the column pass for some distance in contact with substantially pure sulfuric acid.

In testimony whereof, I have signed my name to this specification in the presence of two subscribing witnesses.

HARRY PAULING.

Witnesses:
MATHILDE K. HELD,
A. V. W. COTTER.